(12) United States Patent
Call et al.

(10) Patent No.: US 6,623,603 B1
(45) Date of Patent: Sep. 23, 2003

(54) METHOD AND APPARATUS FOR WATER PURIFICATION

(75) Inventors: Charles J. Call, Pasco, WA (US); Alireza Shekarriz, Columbia, MD (US); Mike Powell, Kennewick, WA (US); Seung-Ho Hong, Richland, WA (US); Robert Beckius, Richland, WA (US); Ezra Merrill, Albuquerque, NM (US)

(73) Assignee: MesoSystems Technology, Inc., Kennewick, WA (US)

( * ) Notice: Subject to any disclaimer, the term of this patent is extended or adjusted under 35 U.S.C. 154(b) by 0 days.

(21) Appl. No.: 09/422,200

(22) Filed: Oct. 19, 1999

Related U.S. Application Data

(60) Provisional application No. 60/105,045, filed on Oct. 20, 1998.

(51) Int. Cl.7 .............................. B01D 1/00; B01D 3/02
(52) U.S. Cl. ...................... 202/155; 165/167; 159/28.6; 159/18; 202/165; 202/172; 202/176; 202/186; 202/189; 422/191; 422/192; 422/198
(58) Field of Search ................................ 202/172, 155, 202/176, 189, 267.1, 182, 186, 160, 165; 159/24.1, 18, 28.6, 44, 27.3; 165/167; 422/191, 192, 198

(56) References Cited

U.S. PATENT DOCUMENTS

| 3,635,799 A | | 1/1972 | Lowi, Jr. ...................... 202/83 |
| 3,801,284 A | * | 4/1974 | Meckler ...................... 202/176 |
| 3,907,025 A | * | 9/1975 | Malcosky et al. .......... 165/146 |
| 4,671,856 A | * | 6/1987 | Sears .......................... 202/172 |
| 4,769,113 A | * | 9/1988 | Sears .......................... 202/182 |
| 5,968,321 A | * | 10/1999 | Sears .......................... 202/176 |

* cited by examiner

Primary Examiner—Virginia Manoharan
(74) Attorney, Agent, or Firm—Ronald M. Anderson

(57) ABSTRACT

A method and apparatus for purifying water by using thermal and/or thermocatalytic processes. The method and apparatus are particularly useful for processing impure water to remove and/or deactivate toxic inorganic, organic, and/or biological species such as Sarin, mustard gas, phosgene, cyanogen chloride, anthrax, E. coli, Giardia cysts, salmonella, hepatitis, and Norwalk viruses. In the thermal process, contaminated water is heated (preferably superheated) forming steam, whereby a majority of inorganic and biological species are removed or deactivated from the water. The steam is then condensed, forming liquid purified water. In the thermocatalytic process, the steam is brought into contact with a hydrolysis catalyst, preferably in the form of a coated surface or replaceable catalyst element. The hydrolysis catalyst, which may be a metal oxide, thermocatalytically deactivates at least 90% of the organic or biological species in the water, converting them to less toxic organic species or non-viable biological species. Various embodiments of the apparatus are provided, including portable configurations. Each of the embodiments include at least one boiler, at least one condenser, and a water reservoir arranged in heat exchange relationship so as to improve an overall operating efficiency of the apparatus. The apparatus is heated using a portable stove or other heat source, and a counterflow heat exchanger preheats water that is to be vaporized and cools the purified liquid water formed in a condenser.

3 Claims, 8 Drawing Sheets

METHOD AND APPARATUS FOR WATER PURIFICATION

RELATED APPLICATIONS

This application is based on a prior copending provisional application, Serial No. 60/105,045, filed on Oct. 20, 1998, the benefit of the filing date of which is hereby claimed under 35 U.S.C. §119(e).

GOVERNMENT RIGHTS

This invention was made under contract with the United States Defense Advanced Research Projects Agency (DARPA), under Contract No. DABT63-98-C-0054. The United States Government may have certain rights in the invention.

FIELD OF THE INVENTION

The present invention generally concerns water purification, and more specifically, the purification of water containing toxic species, using thermal and thermocatalytic processes and apparatus.

BACKGROUND OF THE INVENTION

It is often necessary to purify water by removing inorganic, organic, and biological species from the water before it can be used or consumed. Methods for removing particulate and chemical species from water are well known, and include distillation, reverse osmosis, freezing, ionization, photocatalytic treatment, and carbon filtration. Examples of such methods are disclosed in U.S. Pat. Nos. 5,007,994; 5,227,053; 5,133,858; and 4,717,476. In addition, there are many well-known methods for destroying bacteria in water, including boiling, using submicron filtration, and disinfectant processes using chlorine, bromine, iodine, or other strong oxidizers. Treatment with heat or disinfectants may also be used sterilize water containing harmful viral agents.

In many instances, it is desired to have access to a portable means for purifying water. For example, it is often impractical for campers, hikers, mountain climbers, and others who are outdoors for extended period of time, to rely on treated water that they would be required to carry throughout an outing extending over several days. In these instances, it will be preferable to rely on local water sources, such as streams or lakes, which typically contain various particulate and mineral contaminants, including dirt, salt, algae, etc., and also may contain bacterial or viral contaminants. Although the methods and devices discussed above might be used to purify water flowing in a stream or lake water, some of the methods are unsuitable for portable use, because, e.g., they require heavy or bulky equipment, or substantial mechanical or electrical power. In view of the problem, several portable water purification devices have been developed, including those disclosed in U.S. Pat. Nos. 5, 273,649; 5,268,093; 5,244,579; and 3,635,799.

A related but more troubling problem arises during military conflicts when it is necessary to provide potable water to troops in the field. A land force may intend to use local groundwater or surface water after it has been purified, while a pilot that has been shot down will be forced to use any available source of water that can be found. During warfare, untreated water is potentially contaminated with a variety of toxic species, including chemical warfare agents such as Sarin, mustard gas, phosgene, and cyanogen chloride. In addition, water may contain biological warfare agents such as Anthrax, or other biological toxins, including E. coli, salmonella, hepatitis, and Norwalk virus. The portable water treatment devices disclosed in the prior art patents noted above do not adequately remove or deactivate (i.e., reduce to a less toxic species) such toxic species, and while large scale water purification systems may be capable of removing or deactivating such toxins, they are impractical for use on the battlefield, or by individuals separated from their support personnel, such as a downed pilot. It would therefore be desirable to provide a water purification apparatus that is small, lightweight and easy to operate, yet capable of purifying water containing some or all of the foregoing toxic species, as well as more common contaminants such as dirt, salt, algae, and the like. Furthermore, it is desirable that this apparatus comprise components that are readily serviceable in the field.

SUMMARY OF THE INVENTION

The present invention addresses the foregoing problems by providing a process and associated apparatus for purifying water and is particularly useful in removing from water toxic inorganic, organic, and/or biological species such as Sarin, mustard gas, phosgene, cyanogen chloride, Anthrax spores, E. coli bacteria, Girardia cysts, Hepatitis virus, and Norwalk virus. The process includes a purification step that employs a hydrolysis catalyst to cause steam contacting the catalyst to thermocatalytically deactivate at least 90% of the organic or biological species, changing them to less toxic organic species or non-viable biological species, respectively, thereby purifying the steam. The apparatus can be configured in different embodiments, including lightweight portable versions suitable for recreational and/or military uses.

According to a first aspect of the invention, a process is provided for removing toxic inorganic, organic, and/or biological-species from water, wherein such species have a size less than 10 $\mu$m and a concentration of less than 50,000 parts per million (ppm). The process begins by heating the contaminated water to convert a portion of it into steam, preferably at least 20%, and most preferably at least 50%. The steam is then made to contact a hydrolysis catalyst at a sufficient temperature to thermocatalytically deactivate at least 90% of the organic and/or biological species, converting them to less toxic organic species or non-viable biological species, respectively, thereby purifying the steam. The hydrolysis catalyst preferably comprises a metal oxide, such as titanium oxide or magnesium oxide. The steam is then condensed and cooled to produce purified water. The steam is preferably made to contact the hydrolysis catalyst by circulating the steam through a passage comprising a surface coated or covered with the catalyst, or containing a replaceable element comprising the catalyst. The temperature of the region in which the steam is exposed to the hydrolysis catalyst is preferably at least 100° C., and most preferably at least 300° C.

The process can be repeated using water that has already been partially purified by the present method, as the "contaminated" water input to the process, until a desired level of purity in the water output from the process is achieved. The overall efficiency of the process is enhanced by using a counterflow heat exchanger to preheat the water that is input to the process and to cool condensed water that has been purified by the process.

According to a second aspect of the invention, apparatus are defined for purifying water according to the process discussed above. The apparatus include a vaporizing device that converts at least 20% of the water into steam, thereby removing a substantial portion of any inorganic species (such as salt, dirt, etc.) present in the water, and deactivating a substantial portion of any biological species present in the water. The purified steam is then condensed to form liquid water in a condenser, which may optionally include an evaporative subcooler.

According to another aspect of the invention, the vaporizing device preferably comprises a preheater, a boiler, and a superheater. The preheater heats the water to a temperature less than boiling before the water enters the boiler, and in the boiler, at least a portion of the preheated water is converted to steam. In the superheater, the steam is superheated at a higher-than-atmospheric pressure. The vaporizing device preferably is heated using a gas-fired heat source that burns a fuel such as butane. Preferably, the preheater comprises a counterflow heat exchanger having "mesochannels" that transfers heat between an incoming supply of water and exiting condensed water to preheat the water entering the boiler.

Various embodiments are provided, including one that has a catalytic reactor in which the thermocatalytic reaction is performed. The catalytic reactor is preferably made of metal with a surface comprising a hydrolysis catalyst, such as a metal oxide. Optionally, a replaceable catalyst element comprising a suitable hydrolysis catalyst is disposed within the catalytic reactor. The reaction between the steam and the hydrolysis catalyst causes a thermocatalytic reaction that deactivates a substantial portion of any organic toxins present in the steam to produce purified steam. The purified steam then enters a condenser that cools the steam, forming liquid water.

Components of the apparatus are preferably arranged so as to maximize the overall heat efficiency of the apparatus. In one preferred embodiment, the apparatus comprise a primary boiler and condenser, and a secondary boiler and condenser. The primary boiler generates superheated steam, which is condensed in the primary condenser at an elevated temperature and pressure (i.e., above 100° C. and above atmospheric pressure). The secondary boiler is disposed in thermal communication with the primary condenser, so that heat is transferred from the superheated steam/superheated condensed water in the primary condenser to water in the secondary boiler through thermally conductive surfaces of the primary condenser and the secondary boiler, which preferably share a common wall or shell.

According to another aspect of the invention, portable apparatus are provided for purifying water with a portable heating device, such as a hiking or camping stove. A first preferred embodiment includes a core boiler section and a series of concentric shells that are offset from one another so as to form adjacent annular volumes respectively comprising a condenser and reservoir. The core boiling section is heated with the flame from the portable heating device, thereby converting a portion of unpurified water in the boiler that has been received through a passageway connecting the boiler to the reservoir into steam. The steam exits the boiler, and is condensed, forming liquid water, which is cooled in the condenser. This cooled liquid water can be removed through a tap connected to the condenser.

The reservoir provides sufficient capacity to store extra water that absorbs heat from the condenser shell, thereby improving the condensation and cooling efficiency of the apparatus and preheating the water in the reservoir. The boiler may also comprise a surface area coated with a hydrolysis catalyst or defining a region in which a replaceable hydrolysis catalyst element is disposed. When steam generated by the boiler passes over the hydrolysis catalyst, a thermocatalytic reaction occurs, resulting in the destruction or deactivation of a majority of any toxic organic species present in the unpurified water. The portable apparatus further preferably include a counterflow heat exchanger that preheats the water entering the boiler and cools the water exiting the condenser.

According to yet another aspect of the invention, the portable apparatus include a secondary boiler and secondary condenser, in addition to the primary boiler, primary condenser, and water reservoir discussed above. The primary boiler is supplied with pressurized water, and operates under a pressure substantially above atmospheric, enabling superheated steam to be produced and maintained at a temperature well above the boiling temperature of water at atmospheric pressure, thereby enhancing the purification efficacy. The steam is condensed in a primary condenser, producing condensed superheated water that enters a secondary boiler operating at a lower pressure than the primary boiler. The water is again converted into steam, and cooled in the secondary condenser by transferring heat to water stored in the water reservoir.

In an optional configuration of this portable apparatus, the primary boiler also includes a surface area coated with a suitable hydrolysis catalyst, or contains a replaceable catalyst element, enabling a thermocatalytic reaction to occur in the manner described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

General Overview

Figure 1:
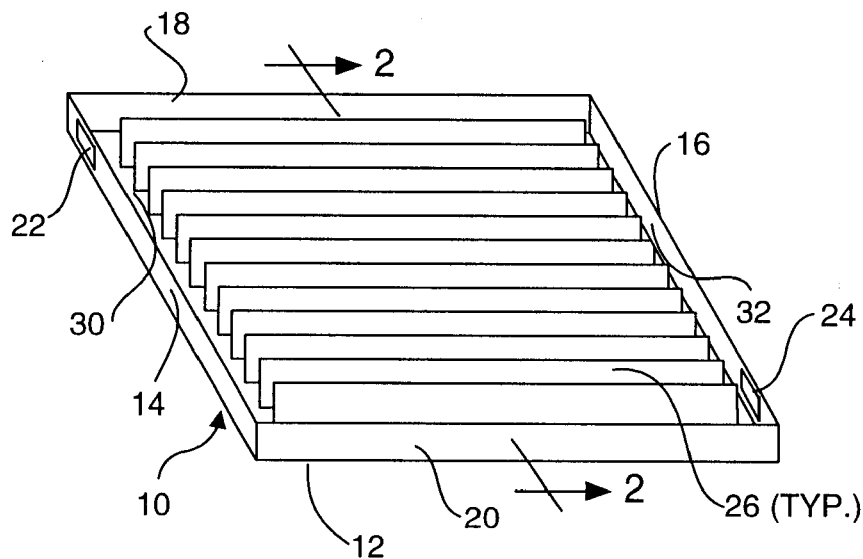
FIG. 1 is an isometric view of an embodiment of the heat exchange plate (without a cover) as used in the present invention.

The present invention concerns a process and apparatus for purifying water and is particularly useful in purifying water containing toxic inorganic or organic chemical and/or biological species. In a thermal purification process, a distillation cycle is employed to purify water contaminated with inorganic and biological species, while in a thermocatalytic purification process, water is exposed to a hydrolysis catalyst while in a vaporized phase, thereby deactivating certain toxic organic chemical species that may be present in the water. The efficiency of each of these processes is enhanced through the use of counterflow heat exchangers that preferably comprise a plurality of "mesochannels," details of which are disclosed below.

The term "toxic inorganic, organic and/or biological species" as used herein refers to inorganic particles and substances, bacteria, and viruses that can cause illness or death in humans. Examples of well-known agents falling within this definition and of particular concern are Sarin, mustard gas (bis(2-chloroethyl)thioether), phosgene, cyanogen chloride, anthrax spores, $E.$ $coli$ bacteria, Girardia cysts, salmonella bacteria, Hepatitis virus, and Norwalk virus. Preferably, the concentration level of any of these contaminants in the water that is to be purified by the present invention is initially less than 50,000 parts per million (ppm), more preferably less than 20,000 ppm, and most preferably less than 10,000 ppm.

In order to carry out the thermal and thermocatalytic processes of the present invention, a portion of the contaminated water is first converted into steam. This step may be carried out by passing the water through one or more heating devices that vaporize at least a portion of the liquid water. Converting the water into steam leaves behind and thus removes a majority of inorganic contaminants and deactivates biological toxins such as $E.$ $coli$ that may be present in the water. In the thermocatalytic process, the steam is brought into contact with a hydrolysis catalyst in a catalytic reactor. Preferably, internal passages of the catalytic reactor include surfaces comprising a suitable hydrolysis catalyst or a replaceable catalyst element to which the steam is exposed while flowing through the internal passages. For example, in one preferred form of the invention, an aluminum flow channel or plate is coated with a metal oxide to produce the catalyst surface.

The vaporizing device may be any device having an enclosed passage with an inlet and outlet and a heat source to heat a portion of the water passing through the device sufficiently, so that the water is converted into steam. In one preferred configuration of the invention, a plurality of generally planar-shaped components are arranged in a stacked heat exchange configuration to perform a distillation cycle. The vaporizing device includes a generally planar-shaped enclosure (i.e., an enclosure shaped like a thin, rectangular box) defining one or more internal passages through which the water/steam is circulated. Internal passages in the vaporizing device are preferably less than 5 mm in height. Heat is transferred to the water that is flowing within the internal passages to vaporize a portion of the water so that steam and water exit through the outlet. The remainder of the water preferably is dumped through a drain.

In accord with another preferred configuration, a plurality of annular components are placed in heat-transfer relation to one another to perform a similar distillation cycle. In this configuration, the vaporizing device comprises an annular volume that includes an internal wall, which is heated to vaporize a portion of water contained in the annular volume. The vaporized portion of water (i.e., the steam) exits the vaporizing device through one or more outlet ports defined in an upper portion of the device.

In both of the foregoing embodiments, heat can be provided by any suitable external source, such as a butane or propane burner. Preferably, the water passing through the vaporizing device is heated sufficiently to convert at least 20% of the water to steam, but more preferably, at least 50%.

In most instances, converting the water into steam will remove and/or deactivate a majority (or all) of any inorganic (i.e., salts, dirt, etc.) and biological contaminants (e.g., $e.$ $coli$) present in the water. Inorganic contaminants, such as salt and dirt, remain in the portion of the water that isn't converted to steam and can easily be removed from the boiler through a drain, or by simply dumping the water from the apparatus. Various biological contaminants, such as bacteria and viruses, are deactivated upon exposure to high temperatures. As a result, the steam comprises a purified form of water (in vapor phase), and purified liquid water can be obtained by cooling and condensing the steam.

Cooling of the steam to form liquid water is performed by a condensing device, which preferably should be arranged in heat transfer relationship with other apparatus elements to maximize overall efficiency. In one preferred configuration, the condensing device is in heat transfer relationship with an incoming stream of liquid water that is to be at least partially vaporized, and/or one of its walls is common to a reservoir in which the contaminated water is stored prior to entering the boiler. In these instances, the steam is condensed and cooled in the condensing device by heat transfer with the incoming water (through the reservoir wall), thereby preheating the contaminated water entering the vaporizing device. In a preferred configuration, a counterflow heat exchanger is employed to further preheat the contaminated water before it enters the vaporizing device. Heat is transferred to the contaminated water from a stream of hot condensed purified water exiting the condenser, thereby both preheating the contaminated water and further cooling the purified liquid water. These configurations improve the overall efficiency of the apparatus by reducing the energy requirements necessary to purify a given quantity of water. Furthermore, the condensing device should preferably be designed so that it can be easily and readily cleaned and/or removed from the rest of the apparatus, since a precipitate will likely form on internal surfaces of the condensing device over time. It is also contemplated that an evaporative cooler may be used to further cool the purified liquid water exiting an outlet port of the condensing device.

Generally, the internal flow passages in the foregoing vaporizing and condensing devices should preferably have a height and width of least 0.01 mm, more preferably, at least 0.1 mm, and most preferably, at least 0.5 mm, but preferably no greater than 100 mm, more preferably, no greater than 50 mm, and most preferably, no greater than 5 mm. If multiple devices are stacked in a heat exchanger configuration, its is preferable that the devices in contact with each other share a common wall. For example, a fully enclosed device can be stacked atop a second device of similar configuration that does not have a cover plate so that the bottom of the fully enclosed device serves as a cover plate for the device on which it is stacked. (See the discussion of FIG. 3 below.) The channel flow path through such devices may have any configuration that facilitates flow through the component, such as a serpentine path, but a relatively straight, single-pass flow path is believed to be the most efficient from a fluid flow and heat exchange efficiency standpoint.

The components comprising the present invention may be made of any suitable material and fabricated by any suitable process, but are preferably made from aluminum, nickel, or copper-based metal or alloys, or alternatively, from ceramics. Milling or stamping processes may be used to form the channels in metal plates or sheets, or the channels may be formed in an extrusion process.

Details of an Exemplary Heat Exchange Plate

Figure 2:
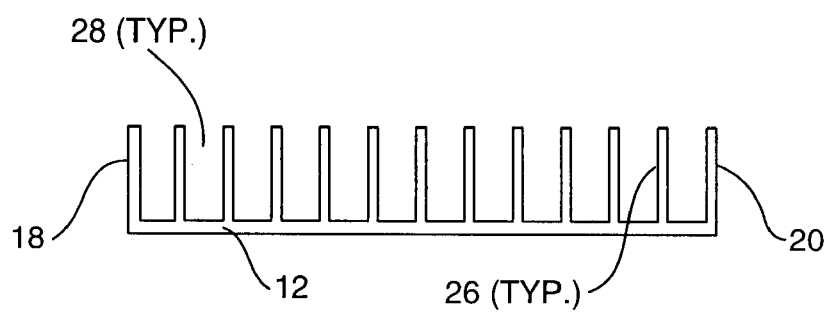
FIG. 2 is a cross-sectional view of the heat exchange plate, taken along section line 2—2 in FIG. 1.

Each of the thermal- and thermocatalytic processes requires an input of heat to operate. Since it is desired to conserve as much energy as possible, each process preferably employs novel "mesochannel" heat exchangers, such as an exemplary heat exchange plate 10 described herein and shown in FIGS. 1 and 2. Heat exchange plate 10 (illustrated with its cover plate removed) is suitable for use in a distillation apparatus that includes the vaporizing device, condensing device, and preheat heat exchanger discussed above. A generally planar bottom plate 12, sides 14 and 16, and ends 18 and 20 define heat exchange plate 10. An inlet port 22 is defined in side 14 adjacent to end 18, while an outlet port 24 is defined in side 16 adjacent to end 20. A plurality of elongate and rectangular shaped parallel dividers 26 extend upwardly from the bottom plate to define multiple flow paths 28. The dividers extend across a majority of the bottom plate, but do not contact sides 14 and 16, so that the spacing between the ends of the dividers and the sides forms passages 30 and 32, respectively. Passages 30 and 32 extend generally parallel to and along the inner surfaces of sides 14 and 16. The arrangement of the dividers permit an incoming flow of fluid entering inlet port 22 to be divided among multiple flow paths 28, and then recombine on the opposite ends of the flow paths, so that the fluid exits the device through outlet port 24. A cover plate (not shown) is disposed on top of the dividers to close the open sides of the flow paths.

Figure 3:
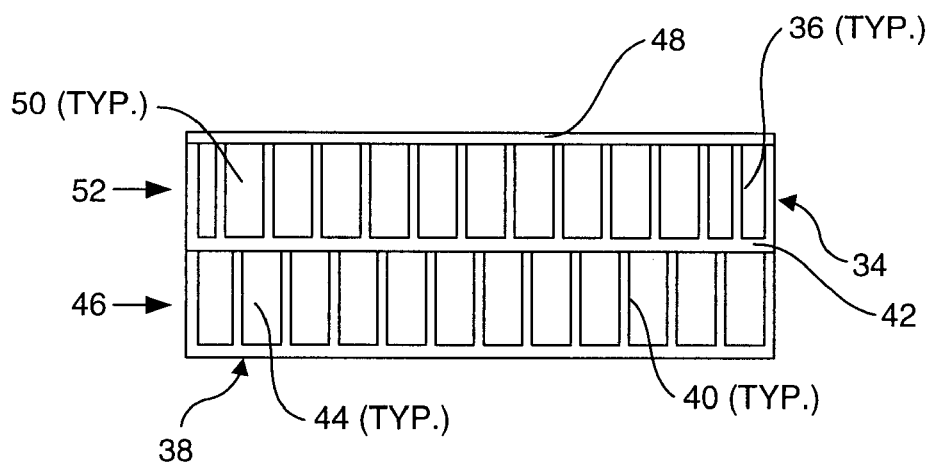
FIG. 3 is a cross-sectional view of the heat exchange plate of FIGS. 1 and 2 (used as a catalytic reactor), used as a superheater and arranged in a stacked configuration as a counterflow heat exchanger.

FIG. 3 shows a cross-section of a counterflow heat exchanger assembly comprising a pair of the heat exchange plates that are stacked and share a common wall. A first heat exchange plate 34 with dividers 36 is disposed atop a second heat exchange plate 38, with dividers 40, and a bottom plate 42 (i.e., the common wall) of first heat exchange plate 34 serves as a cover for second heat exchange plate 38. A plurality of enclosed flow paths 44 are thus defined in a first layer 46. A cover plate 48 is disposed atop dividers 36 to form another plurality of enclosed flow paths 50 in a second layer 52. First layer 46 and second layer 52 may be used as a counterflow heat exchanger if a first stream of fluid is caused to flow the first layer in one direction, and a second stream of fluid is caused to flow through the second layer in an opposite direction. The plurality of dividers act as heat transfer fins, thereby aiding the transfer of heat between the two layers, from the higher temperature fluid stream to the lower temperature fluid stream.

The size of the pathways defined by the channels is very important. Preferably, the size of the pathways (i.e., the largest cross-sectional dimension) should be in the range of approximately 0.5 mm–2 mm. Heat exchangers comprising pathways of this size are known as "mesochannel" heat exchangers, wherein the term "meso" means in-between and thus refers to a size between a macro scale (corresponding to objects whose size is typically given in units of measure such as centimeters or inches, and a micro scale (corresponding to objects whose size is typically given in units of measure such as microns or nanometers).

Experimental testing has shown that that mesochannel heat exchangers provide superior performance over conventional macro scale heat exchangers. Mesochannel heat exchangers have been shown to provide heat transfer rates in excess of 1000 W/m²K, and to exhibit efficiencies greater than 90%. In contrast, conventional macro scale heat exchangers have maximum efficiencies of about 70%.

Figure 4:
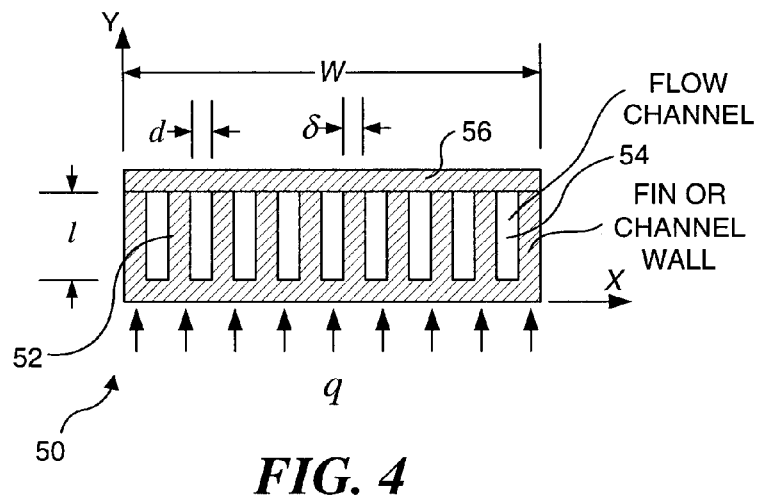
FIG. 4 is a diagram showing a plurality of flow channels in a mesochannel heat exchanger and corresponding parameters used for modeling heat transfer.

FIG. 4 shows a cross-section of a parallel rectangular-shaped channel heat exchanger 50 that is modeled using the following analysis. Heat exchanger 50 includes fins 52 separating channels 54, and the channels are closed by an upper wall 56. Based on laminar flow assumptions, it can be shown that a heat transfer coefficient, h, and friction factor, f, scale in the following manner:

$$h \; k_f/d_h \quad (1)$$

$$f \; 1/R_e \quad (2)$$

In Equations (1) and (2), $k_f$ is the thermal conductivity of the fluid, $d_h$ is the hydraulic diameter of the channels, and $R_e$ is the Reynolds number. Taking into account the greater surface area achieved by reducing fin thickness δ between channels, additional heat transfer enhancement is realized. At the limit when the fin thickness is much smaller than the width of the channels, the amount of enhancement is on the order of $(l/d)^2$, where l is the height of the channel and d is its width. (It is assumed that l/d is large and the fin efficiency is close to 100%.) As a practical limitation, the pressure gradient increases faster than the heat transfer enhancement, thereby restricting the channel lengths that can be used.

To be complete, the upper wall closing the channels is shown in the FIG. 4. Although this upper wall may not contribute to improving the heat transfer coefficient in many instances, it can be shown that a closed-channel geometry is preferred over an open-channel geometry for certain applications, such as air cooling electronic devices. The open-fin geometry can result in choking the flow within the channel passages, and, in fact, may yield a lower heat transfer coefficient than would be realized with a plain surface without fins. For example, condensation over integral fin surfaces often suffer from liquid hold-up in between the fins, degrading the condenser performance, and defeating the purpose of using extended surfaces. Under these conditions, the closed channel geometry is preferable.

The effectiveness (i.e., efficiency) of the heat exchanger when used in a counterflow heat-exchange configuration can be determined as a function of the plate geometry by using the first law of thermodynamics and a correlation for the Nusselt number, as follows, $$\varepsilon = [1 + 0.26(l/d_h)^{-2/3} Re_d^{1/2}]^{-1} \quad (3)$$

where $Re_d$ is the Reynolds number corresponding to the hydraulic diameter, which is defined by:

$$Re_d = \left(\frac{\dot{m}}{A_c \mu}\right) d_h \quad (4)$$

In Equation (4), m is the total mass flow rate (given and constant), $A_c$ is the cross sectional area of all the channels (given and constant), and $\mu$ is the dynamic or absolute viscosity of the fluid. For any given mass flow rate and any given fluid, it becomes clear that the heat exchanger efficiency increases as the channels become smaller, and reaches unity as the hydraulic diameter approaches zero. Unfortunately, the pressure drop (i.e., change in fluid pressure as the fluid traverses the length of the channel) increases very rapidly as the cross-section of the channel is decreased. Thus, the heat exchanger designer must consider the tradeoff between increased efficiency and its corresponding pressure drop penalty.

Figure 5:
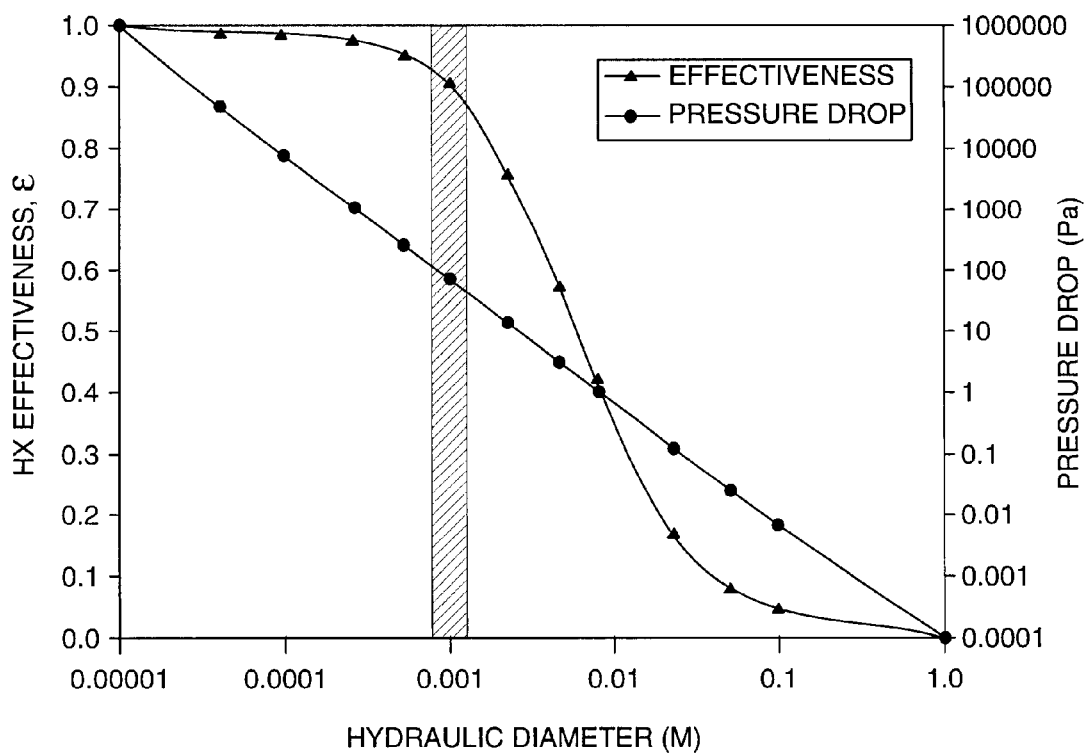
FIG. 5 is a graph showing heat transfer effectiveness and pressure drop vs. hydraulic diameter, which is used for determining an optimal size of the channels in the mesochannel heat exchanger.

FIG. 5 graphically illustrates effectiveness and pressure drop curves corresponding to a specific air-air heat exchanger application where the mass flow rate of the air is maintained at 1 g/s on both sides of the dividers and the length of the channels is fixed at 10 cm. As indicated by the shaded area, an optimum hydraulic diameter (i.e., channel width), when considering both effectiveness and pressure drop effects, is approximately centered-about 1 mm. In this region, the slope of the pressure drop curve starts to become significantly steeper than the slope of the effectiveness curve. As a result, a small improvement in effectiveness will produce a substantial increase in the pressure drop. For example, if the hydraulic diameter is reduced from 1 mm to 100 microns, the pressure drop will increase by two orders of magnitude, while the heat exchanger effectiveness will only increase by about only 8%.

It will be understood by those skilled in the heat exchanger art that the performance of a specific heat exchanger configuration will depend on the particular fluid being used and other parameters, including mass flow rates, temperatures, etc. Furthermore, it is known that phase-change heat transfer effects, such as vaporization and condensation, are difficult to model for channel sizes in the mesoscale range. For instance, using empirically-derived equations corresponding to nucleate boiling results obtained during testing of channels in the macro scale range yields an unrealistically high predicted heat transfer coefficient for mesochannel nucleate boiling. Experimental results indicate that the phase-change heat transfer rates for mesochannels are similar to those determined for the macro scale channel sizes (at the lower end of the macro scale ranges).

Exemplary Thermal-cycle Water Purification Apparatus

Figure 6:
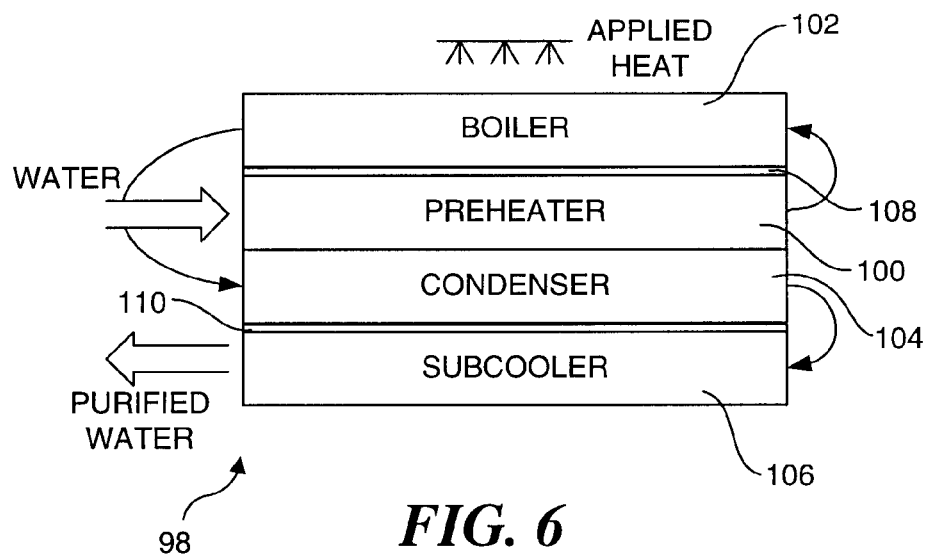
FIG. 6 is a schematic diagram illustrating a first preferred embodiment of the present invention.

FIG. 6 illustrates a water purification device 98 in which contaminated water from a storage device (not shown) enters a preheater 100, which preheats the contaminated water to a temperature less than its boiling point. The contaminated water can be pressurized to cause it to flow into preheater 100 by using a gravity feed (i.e., as a result of the elevational head of the storage device), using a pump, or by employing a pressurized tank as the storage device. The preheated contaminated water enters a boiler 102, which raises its temperature above the boiling point, converting a portion of the contaminated water into purified steam. Next, the steam enters a condenser 104, where it is cooled and condensed back into liquid water. Further cooling of the condensed water may optionally be performed by an evaporative subcooler 106. Preferably, a pair of insulation layers 108 and 110 (preferably made of an aerogel, ceramic, or other material having a relatively high R factor) are disposed between preheater 100 and boiler 102, and between condenser 104 and subcooler 106 to minimize heat transfer between these components, thereby improving the overall efficiency of the system.

Figure 7:
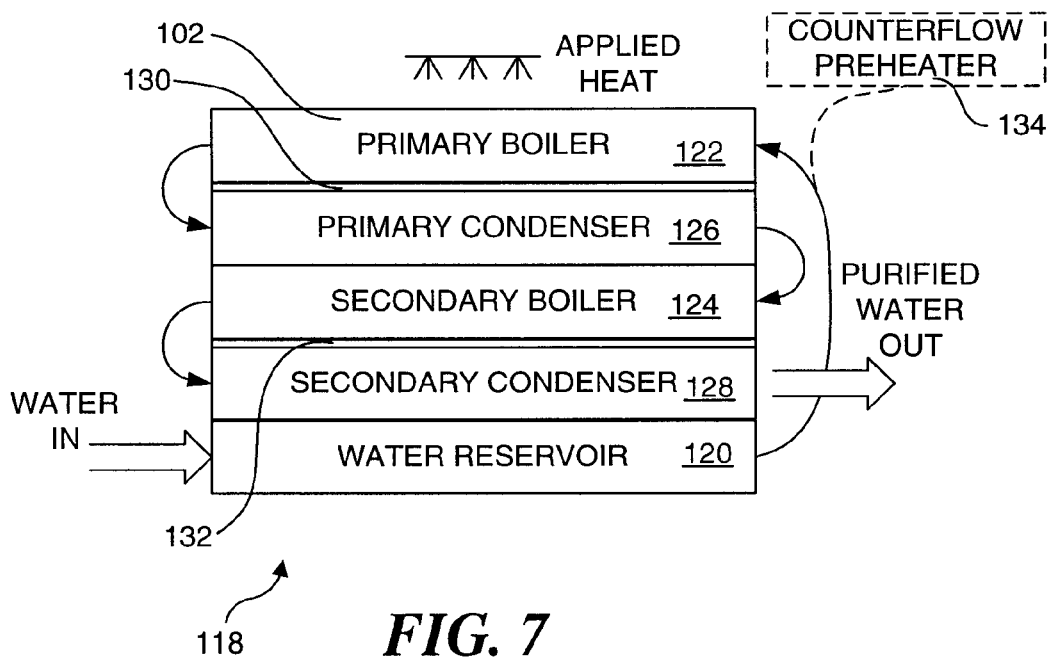
FIG. 7 is a schematic diagram illustrating a second preferred embodiment of the present invention.

FIG. 7 illustrates a variation in which a water purification device 118 comprises a primary boiler 122 and primary condenser 126, and a secondary boiler 124 and secondary condenser 128. Preferably, a pair of insulation layers 130 and 132 are disposed between respective boiler/condenser interfaces, to minimize heat transfer between each boiler/condenser pair, as shown in the Figure. This configuration is operated in the following manner.

A water reservoir 120 is supplied with contaminated water from a storage device (not shown), a pressurized feed (not shown), or is simply filled with water. Preferably, the water in the water reservoir is (or remains) pressurized. The water in water reservoir 120 then enters primary boiler 122, which is operated at a high pressure (e.g., preferably well above atmospheric). Since the primary boiler is operated at an elevated pressure, the temperature at which water is converted to steam is substantially above 100° C. (the corresponding phase-change temperature (e.g., boiling) of water at atmospheric pressure). As a result, the primary boiler generates superheated steam, whereby the efficacy of the removal and/or deactivation of toxic species is enhanced. The superheated steam then enters the primary condenser 126, where it is cooled and condensed back to a liquid state under an elevated pressure and temperature. The condensed water then flows into a secondary boiler that is operated at a lower pressure than the primary boiler. Due to the elevated temperature of primary condenser, sufficient heat is transferred to the secondary boiler to convert the lower-pressure water contained in the secondary boiler back into steam, whereupon it flows into secondary condenser 128 to be cooled and condensed.

Figure 8:
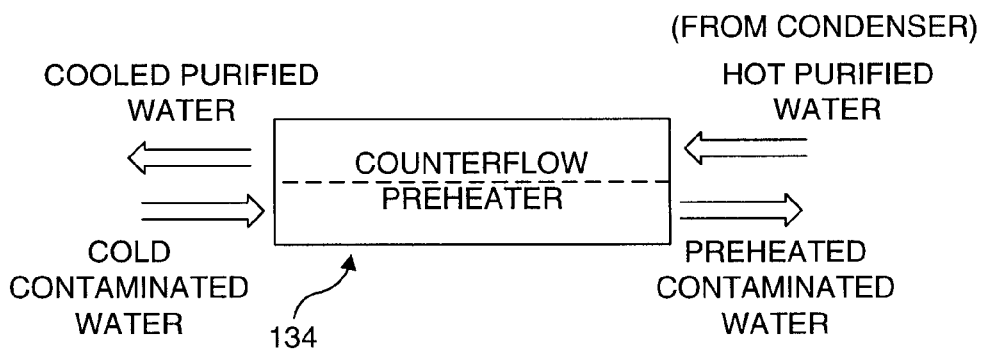
FIG. 8 is a schematic diagram of a counterflow preheater used in preferred embodiments of the present invention.

Preferably, the water entering each of the primary boiler is preheated by a counterflow preheater 134. As shown in FIG. 8, the stream of cold contaminated water from water reservoir 120 enters counterflow preheater 134, where it is preheated by a heat transfer with hot purified water that enters the preheater after it has exited secondary condenser 128. At the same time, the hot purified water exiting the secondary condenser is cooled by the heat transfer. As a result, preheated contaminated water exits one port of the counterflow preheater and flows into primary boiler 122, while cooled purified water exits another port or the counterflow preheater, where it can be removed at a tap (not shown).

Water Purification Using a Thermocatalytic Process

The foregoing thermal-cycle water purification apparatuses are very effective in removing most inorganic chemical contaminants, and removing and/or deactivating any toxic biological species present in the water. However, certain organic chemical toxins, including warfare agents Sarin, mustard gas (bis(2-chloroethyl)thioether), phosgene, and cyanogen chloride, generally cannot be removed by simply heating contaminated water into steam, or even deactivated by superheating. In order to deactivate or remove these toxic compounds, it is necessary to perform further purification processing using a thermocatalytic process.

Catalysts are used to precipitate, promote, and/or accelerate chemical reactions, but are not consumed in the process. Heterogeneous catalytic processes involve more than one phase (e.g., liquid, solid, or gas) and most often a catalyst is in the solid phase, while the reactants and products are liquids and/or gases. Reactant molecules diffuse into and then adsorb upon the catalyst surface, which is often fabricated to have a relatively high surface area that is coated with a small amount of a catalytically active material, such as certain metal oxides, e.g., titanium oxide or magnesium oxide. Once the reactants adsorb on the surface and encounter active catalyst sites (i.e., locations with catalyst material not already occupied by reactants or products), they typically dissociate into smaller fragments and react with fragments of other adsorbed species. Thermocatalytic processes are carried out in the presence of a catalyst at temperatures substantially elevated above ambient, i.e., substantially above 24° C.

The following examples illustrate simple thermocatalytic processes that are well known in the chemical art. The production of ammonia from hydrogen and nitrogen is typically carried out using an iron oxide catalyst at elevated temperatures and pressures. Molecules of hydrogen and nitrogen diffuse to and adsorb upon the iron oxide surface, where the molecules dissociate and react to form ammonia, which subsequently desorbs, thereby making the catalyst site available for adsorption of more reactants. The thermocatalytic oxidation of ethylene in air occurs by a similar process that uses a platinum catalyst. Ethylene and oxygen molecules adsorb onto the catalyst surface, where the oxygen is fragmented into oxygen radicals. These highly reactive radicals react with the adsorbed ethylene (and its oxidation products) forming water and carbon dioxide. The principal reaction for the thermocatalytic oxidation of ethylene is:

$$C_2H_4 + 3\,O_2 \rightarrow 2\,CO_2 + 2\,H_2O \qquad (5)$$

As with most reactions involving the oxidation or reduction of complex molecules, there are many other reactions that also occur when oxidizing ethylene, resulting in the production of less complex molecular structures, which in turn further combine to form carbon dioxide and water, and/or other compounds at low concentration levels. These reactions are omitted here for clarity and because they are not relevant to the present invention.

Experimental testing performed by (or under the guidance of) various defense agencies has identified certain elements and compounds to be effective as catalysts in removing and/or deactivating many chemical warfare agents from air and water at high temperatures. These materials are known as hydrolysis catalysts and include metal oxides, such as titanium oxide and magnesium oxide.

Exemplary Thermocatalytic Water Purification Apparatus

Figure 9:
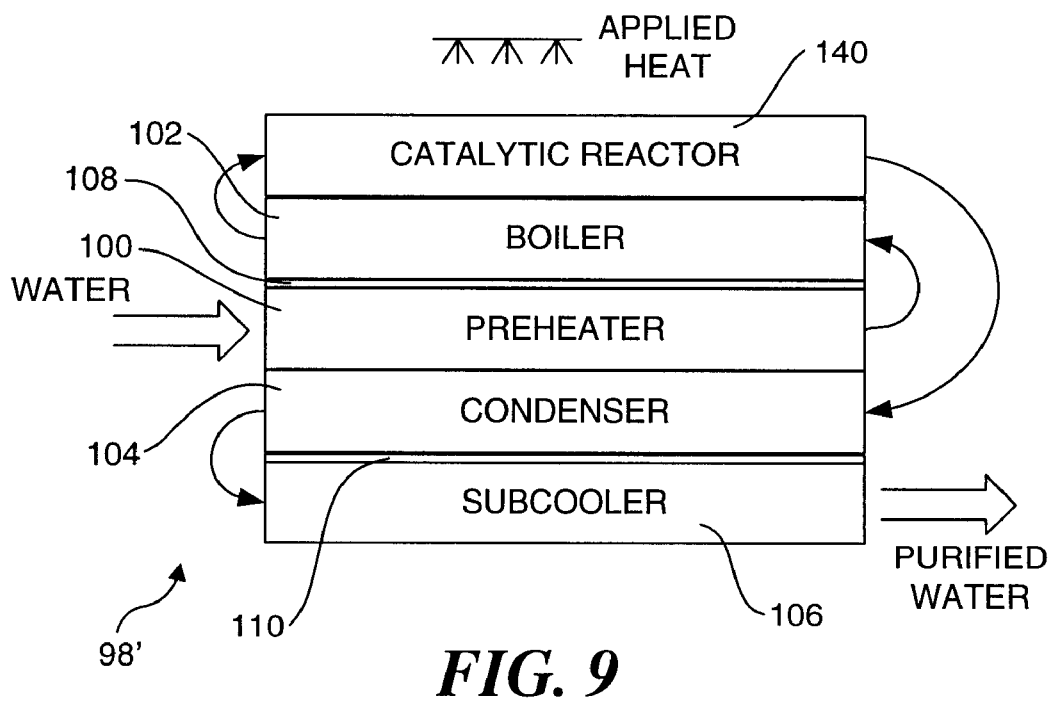
FIG. 9 is a schematic diagram of an optional modification of the embodiment of FIG. 6 that includes a catalytic reactor.
Figure 10:
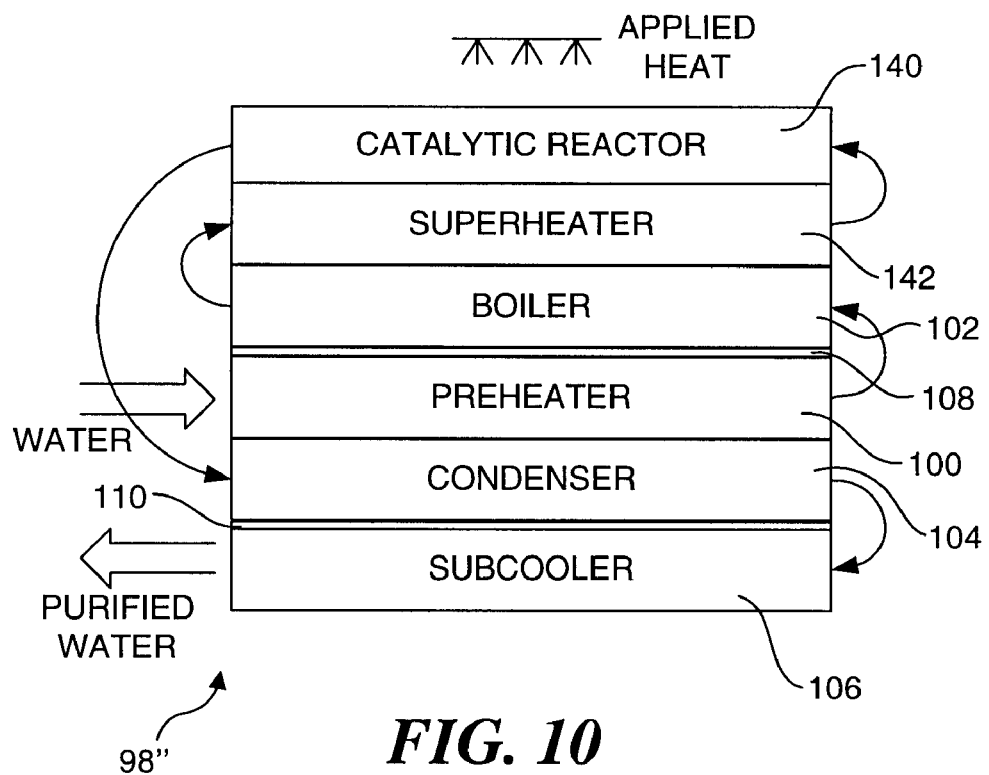
FIG. 10 shows a schematic block diagram of an optional configuration of the embodiment in FIG. 9, further including a superheater that heats steam to a superheated temperature, at higher than atmospheric pressure, prior to the steam entering the catalytic reactor.

FIGS. 9 and 10 respectively show exemplary thermocatalytic water purification apparatus 98' and 98" that include a catalytic reactor 140 for performing a thermocatalytic reaction that is used to remove or deactivate certain toxic inorganic chemical species. In each of these Figures, boiler 102, preheater 100, condenser 104, and subcooler 106 are substantially identical to the corresponding components of water purification device 98, which is shown in FIG. 6, and they operate in substantially the manner discussed above.

As shown in FIG. 9, catalytic reactor 140 is disposed adjacent to boiler 102. Steam exiting the boiler enters the catalytic reactor, where it is caused to flow over a hydrolysis catalyst surface, such as a metal oxide. Preferably, the catalyst surface comprises a portion of a prefabricated catalyst element that is disposed within the catalytic reactor. Suitable catalyst elements of this type are available from various vendors, including the Allied Signal Corporation. The catalyst element induces a thermocatalytic hydrolysis reaction when the steam contacts the catalyst surface, thereby deactivating toxic chemical compounds present in the steam. This hydrolysis reaction purifies the steam, which exits the catalytic reactor and flows into condenser 104, to be cooled and condensed into liquid water.

The catalytic reactor is preferably maintained at a temperature substantially above 100° C. One way to accomplish this condition is to superheat the steam before it enters the catalytic reactor. A configuration for superheating the steam is employed in thermocatalytic water purification apparatus 98", which is shown in FIG. 10, and this configuration includes a superheater 142 disposed between boiler 102 and catalytic reactor 140. The superheater heats the contaminated steam to a higher temperature at an elevated pressure (above atmospheric pressure). The superheated contaminated steam then passes through catalytic reactor 140, where it is purified, as described above. Experimental results have shown that thermocatalytic deactivation of certain toxic chemical species is enhanced at higher temperatures, e.g., temperature above 300° C. After exiting the thermocatalytic reactor, the purified steam is condensed and cooled in the same manner as discussed above.

Portable Embodiments
(a) Single-Stage Portable Water Purification Apparatus

Figure 11:
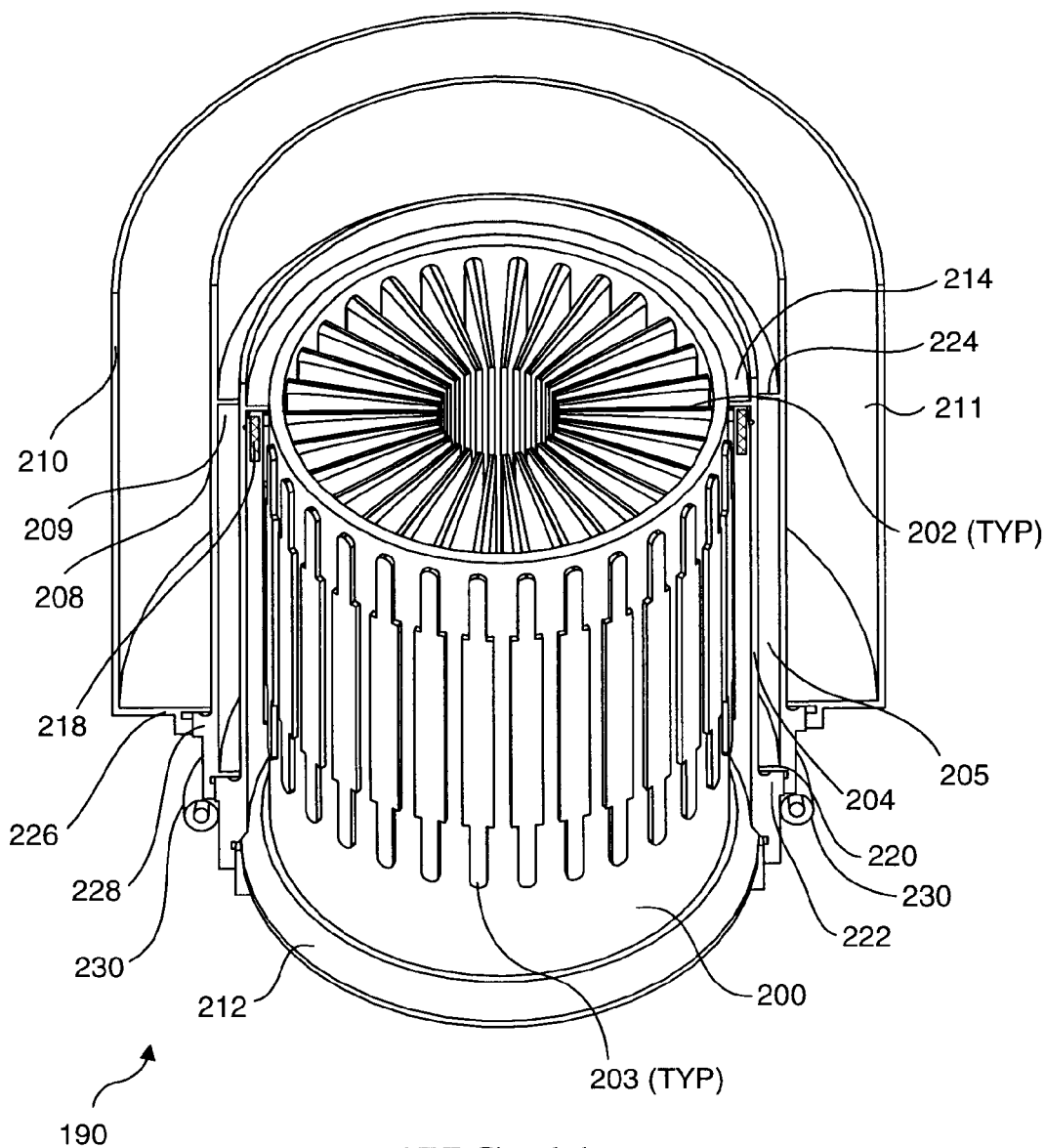
FIG. 11 is a cut-away isometric view of an embodiment of a portable water purifier in accord with the present invention.
Figure 13:
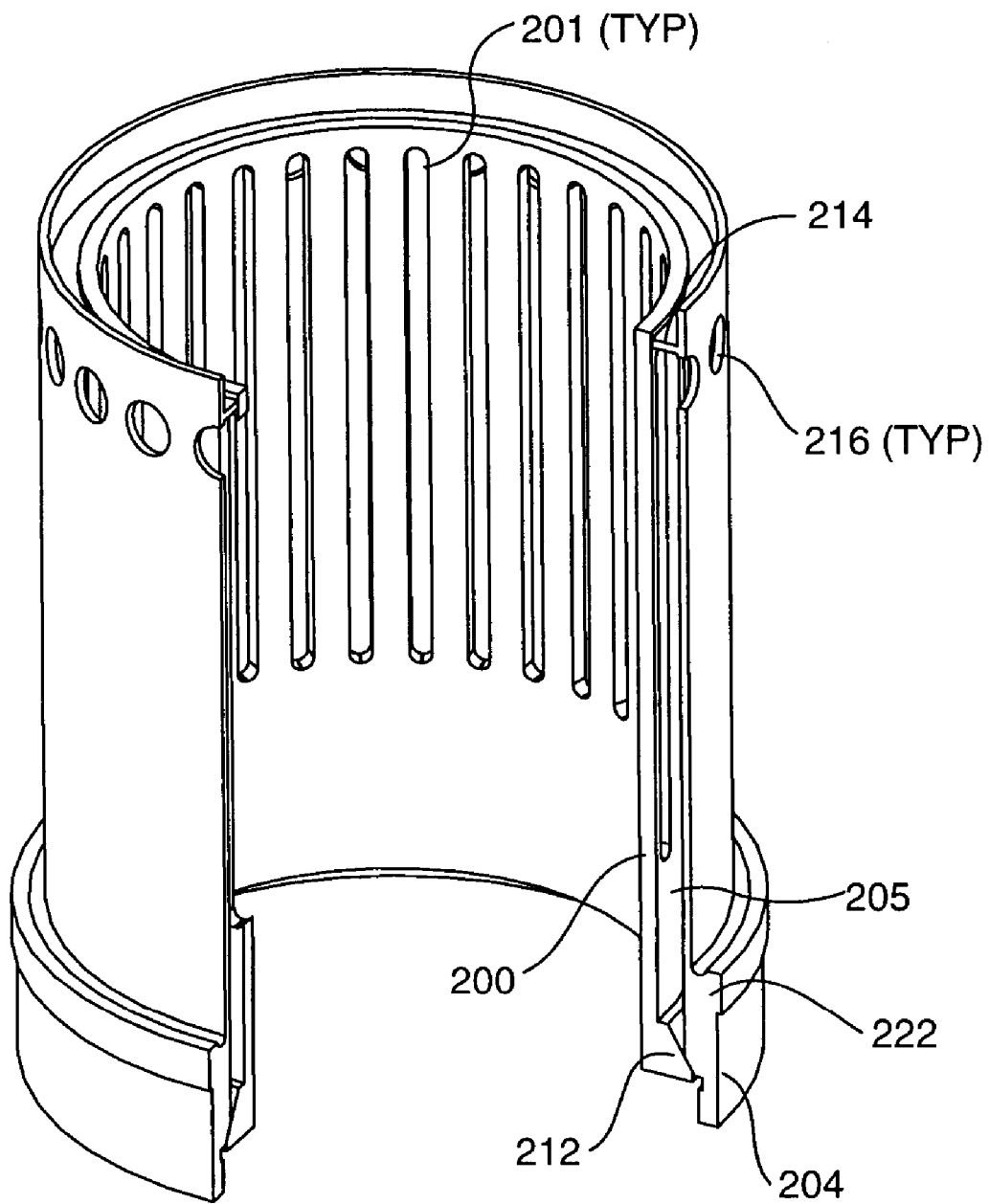
FIG. 13 is a cut-away isometric view of the core and boiler components of the first preferred portable embodiment.

A cut-away view of a single-stage portable water purification apparatus 190 in accord with the present invention that is suitable for use with a portable stove heat source, such as those typically used for camping and hiking, is shown in FIG. 11. The single-stage portable water purification apparatus includes a core 200 with a plurality of radially extending fins 202, a boiler shell 204, a condenser shell 208, and a reservoir shell 210. Each fin 202 includes an elongate tab 203 extending along its radially outer edge that supports the fin within core 200 when the each fin is inserted through one of a plurality of slots 201 formed in the core, as shown in FIG. 13. FIG. 13 illustrates details of the boiler shell and its interface with the core (with the fins removed). Preferably, each of fins 202 is brazed along a portion of the interface defined by its elongate tab and the periphery of the slot in which it is inserted.

A boiler 205 comprises an annular volume defined by the exterior surface of core 200, the interior surface of boiler shell 204, a bottom lip 212 that extends outwardly from the core, and a cap 214 that extends inwardly from near the top of the boiler shell to connect with the top of the core. Boiler shell 204 includes a plurality of orifices 216 disposed proximate its top through which steam from boiler 205 enters a condenser 209. The boiler may optionally contain a catalyst element 218 over which steam flows. Alternatively, the upper portion of boiler 205 may comprise a surface area coated with a hydrolysis catalyst such as a noble metal or a suitable metal oxide. When the hydrolysis catalyst (either the catalyst element or the coated surface area) is contacted by the steam, a thermocatalytic reaction occurs that deactivates a substantial portion of any organic toxins present in the steam, as described above.

Condenser 209 comprises an annular volume defined by the exterior of the boiler shell, the interior of the condenser shell outer wall, a bottom plate 220 that extends inwardly from the condenser shell outer wall and rests on a lip 222 extending outwardly from the boiler shell, and a cap 224 that extends inwardly from near the top of the condenser shell outer wall, connecting with the top of the boiler shell. A water reservoir 211 surrounds the condenser and comprises an open annular volume defined by the exterior of the condenser shell outer wall, the interior of the reservoir shell outer wall, and a bottom plate 226 that extends inwardly from the bottom of the reservoir shell to connect with a lower portion of the condenser shell. The bottom plate rests against a lip 228 that extends outwardly from the condenser shell. An internal passageway (not shown) couples the water reservoir in fluid communication with the boiler to allow water stored in the reservoir to enter the boiler at a controlled rate.

The single-stage portable water purification apparatus operates in the following manner. Impure water obtained, for example, from a nearby lake, stream, or saltwater source is poured into water reservoir 211. A portion of the water continually flows through the internal passageway into boiler 205 from reservoir 211 at a controlled rate. To convert the impure water into steam, heat is applied to core 200 with a suitable heat source, such as a portable stove (not shown) that includes a ring, grill or equivalent structure for supporting utensils, such as pots and pans while they are heated. The single-stage portable water purification apparatus is positioned on the portable stove so that the stove's flame is disposed below core 200. The stove heats the core, which causes raises the temperature of the impure water entering the boiler above its boiling point, thereby converting a portion of the water into steam. The steam passes from boiler 205 into condenser 209 through holes 216. In the condenser, the steam condenses and is cooled due to the heat transfer between the steam and the substantially cooler water in the reservoir immediately adjacent to the condenser.

A tap (not shown) is connected to the condenser to allow the purified liquid water within the condenser to be removed for consumption. In practice, it is likely that the tap will be kept open and a clean storage container, such as a water bottle, will be coupled to the tap to receive the purified water so that the apparatus can operate in a steady-state mode until a substantial portion of the impure water in reservoir 211 has been purified.

In should be noted that reservoir 211 has a much greater volume than either boiler 205 or condenser 209 to ensure that there is a sufficient quantity of water in the reservoir to serve as a heat sink for condensing of the steam within the condenser and for cooling the purified water. For this reason, a significant portion of the impure water in the reservoir will typically not be converted into purified water but instead will be employed as a heat sink and then discarded.

The assumption made for use of the single-stage portable water purification is that there is ample quantities of impure water available, so that additional impure water can be added to the reservoir from time to time, thereby ensuring that the heat sink provided by the water in the reservoir remains relatively cool.

Figure 12:
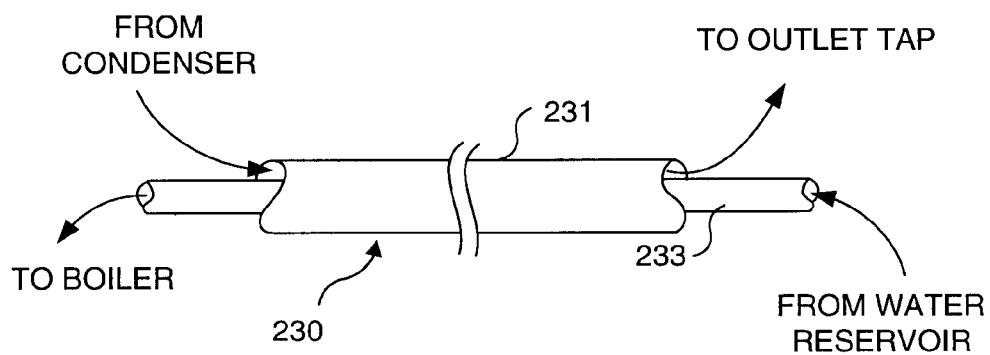
FIG. 12 shows a cut-away portion of a tube-in-tube counterflow heat exchanger used in the first preferred portable embodiment for preheating water entering the boiler and cooling water exiting the condenser.

The overall efficiency of the apparatus can be improved by the addition of a counterflow preheater, as discussed above. Part of such a counterflow preheater is illustrated in FIG. 11 where the end of a tube-in-tube heat exchanger coil 230 appears. As shown in FIG. 12, the tube-in-tube heat exchanger coil includes an outer tube 231 and an inner tube 233. The tubes in the heat exchanger coil are preferably connected to an inlet port of boiler 205 and to outlet ports of water reservoir 211 and condenser 209 (not shown) so that cold water flows from the water reservoir into the boiler through inner tube 233, while hot water flows in an opposite direction through outer tube 231, from the condenser to an outlet tap (not shown). The incoming water (water flowing to the boiler) is preheated by the hot water from the condenser, which in turn is cooled by the cold incoming water, in a counterflow heat exchange process.

(b) Dual-Stage Portable Water Purification Apparatus

Figure 14:
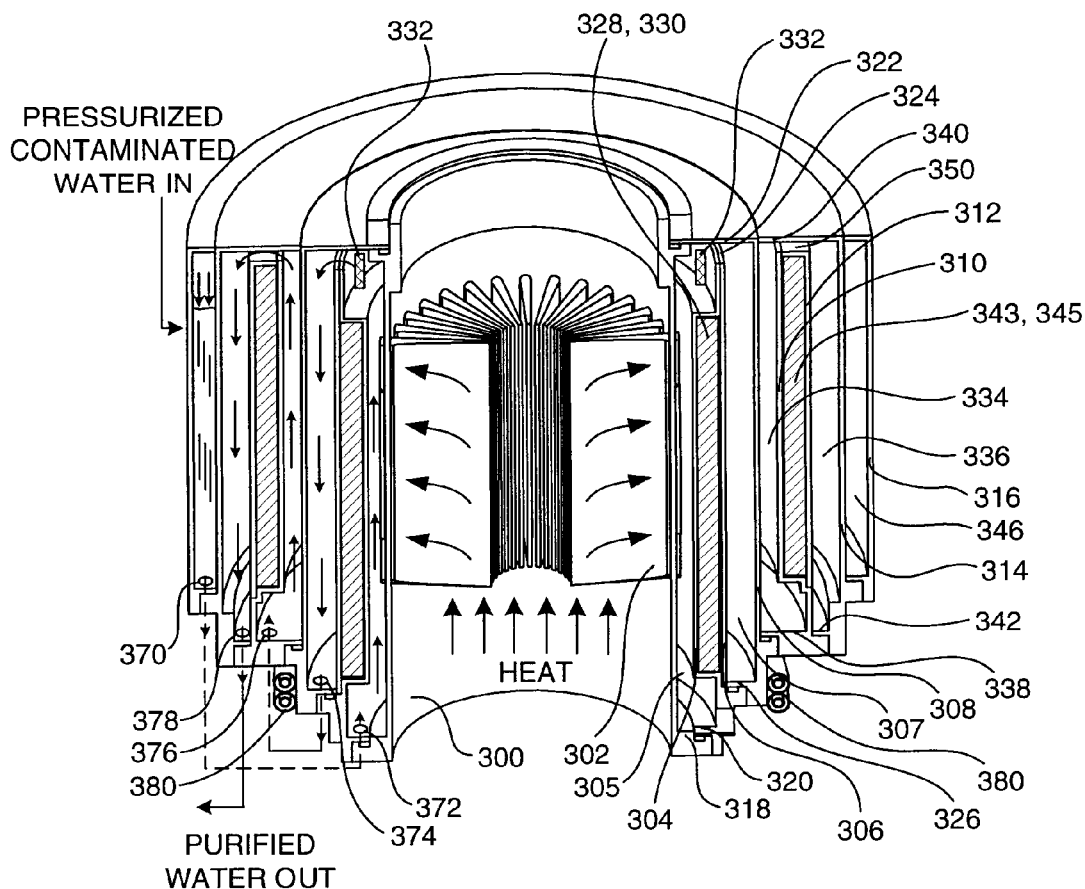
FIG. 14 is a cut-away isometric view of another embodiment of a portable water purifier in accord with the present invention that further includes a secondary boiler and secondary condenser.

A cut-away view of a dual-stage portable water purification apparatus 290 in accord with the present invention is shown in FIG. 14. As implied by its name, this dual-stage portable water purification apparatus purifies the water in two stages or two distillation cycles, which are performed by a primary boiler 305 and a primary condenser 307 and a secondary boiler 334 and a secondary condenser 336.

The dual-stage portable water purification apparatus includes a core 300 having a plurality of radially extending fins 302, a primary boiler shell 304, a primary condenser inner shell 306, a primary condenser outer shell 308, a secondary boiler shell 310, a secondary condenser inner shell 312, a secondary condenser outer shell 314, and a reservoir shell 316. Core 300 and fins 302 are analogous in form and function to core 200 and fins 202 of the single stage apparatus of FIGS. 11–13, and fins 302 are connected to core 300 in a manner similar to that described above for the single stage portable water purification apparatus.

Primary boiler 305 includes an annular volume defined by the exterior surface of core 300, the interior surface of boiler shell 304, a bottom lip 318 that extends outwardly from the core, an overlapping tab 320 that extends inwardly from the boiler shell, and a cap 322 that extends inwardly from near the top of outer condenser shell 308 to connect with the top of the core. A gap 324 is defined between the top of primary boiler shell 304 (and primary condenser inner shell 308) and cap 322, so that steam generated by heating water contained in the lower portion of the primary boiler enters and is condensed within primary condenser 307. The primary condenser also comprises an annular volume, which is defined by its corresponding inner and outer shells 306, 308, a tab 326 that extends inwardly from outer shell 308, and cap 322. Preferably, an annular volume 328, which is filled with a thermal insulator 330, is defined between primary boiler shell 304 and primary condenser inner shell 308 so as to reduce heat transfer between the primary boiler and primary condenser. Thermal insulator 330 preferably comprises an aerogel, or a similar type insulator with a very high R factor.

As with the foregoing single stage water purification apparatus, the primary boiler 305 may also contain a hydrolysis catalyst element 332 over which steam exiting the primary boiler flows, or alternatively, the upper portion of primary boiler 305 may comprise a surface area coated with a hydrolysis catalyst, such as a noble metal.

A primary difference between the single stage water purification apparatus and the dual-stage portable water purification apparatus is the use of a secondary distillation cycle that is implemented by secondary boiler 334 and secondary condenser 336. The secondary boiler and secondary condenser are similar in design to the primary boiler and primary condenser, respectively. Secondary boiler 334 includes an annular volume defined by secondary condenser outer shell 308, secondary boiler shell 310, a tab 338 that extends inwardly from a bottom portion of the secondary boiler shell, and a cap 340 that extends inwardly from near the top of secondary condenser outer shell 314.

Secondary condenser 336 also includes an annular volume, which is defined by secondary condenser inner and outer shells 312, 314, a tab 342 that extends inwardly from a lower portion of outer shell 314, and cap 340. A gap 344 is defined between the top portions of the secondary boiler and condenser, and the gap enables steam generated in the secondary boiler to be conveyed into the secondary condenser, where it is condensed, forming liquid water. Preferably, an annular volume 343, which is filled with a thermal insulator 345, is defined between secondary boiler shell 310 and secondary condenser inner shell 312, so as to reduce heat transfer between the secondary boiler and secondary condenser. Insulator 345 preferably comprises an aerogel, or an alternative thermal insulator with a very high R factor.

A water reservoir 346 is disposed immediately adjacent to the outside of secondary condenser 336 and includes an annular volume defined by the outside of secondary boiler outer shell 314, reservoir shell 316, a tab 348 that extends inwardly from a lower portion of the reservoir shell, and a cap 350 that extends inwardly from near the top of the reservoir shell.

The dual stage water purification apparatus is operated as explained below, with reference to the arrows on the left hand portion of the Figure, which represent the flow path of the water/steam through the two distillation cycles. In order to operate effectively, the dual stage water purification apparatus must be supplied with water under sufficient pressure to maintain flow through the apparatus. In particular, the pressure in water reservoir 346 must exceed the pressure in the primary boiler, which is preferably operated at a pressure level of about 5 psig. Pressurized water is pumped into water reservoir 346 using an appropriate device, such as that described below, which is connected to an inlet port (not shown) in the upper portion of water reservoir 346.

Figure 16:
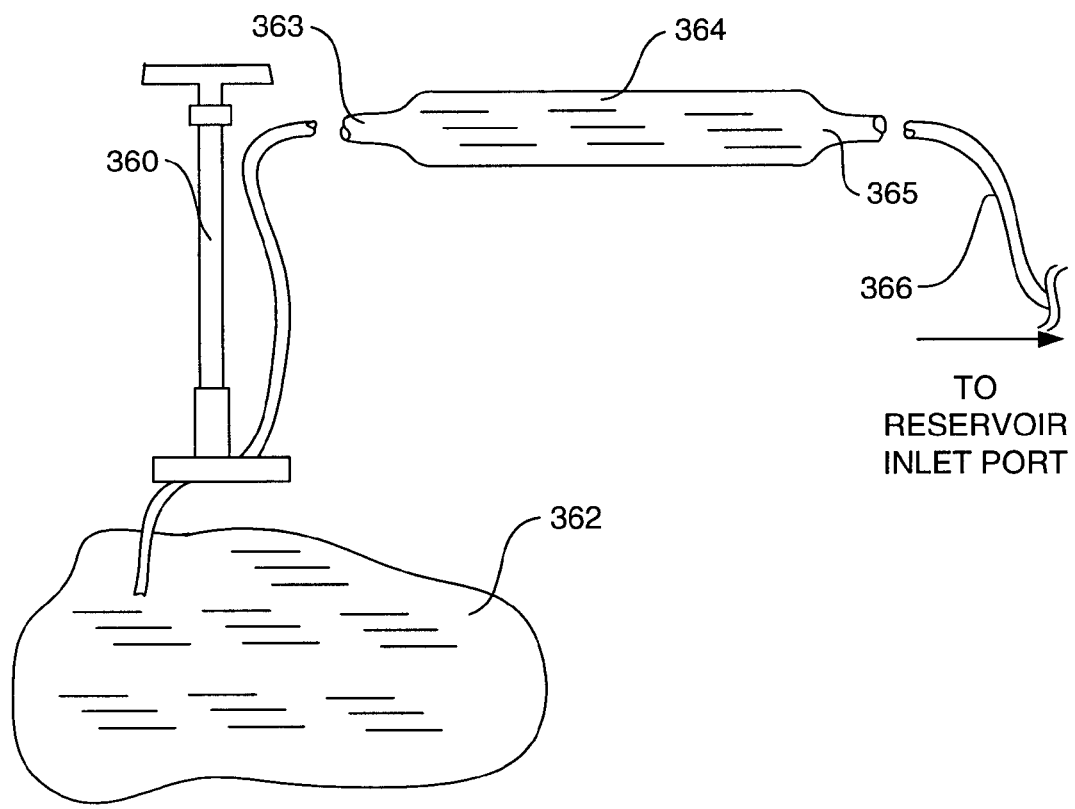
FIG. 16 is a schematic diagram used for illustrating a pump for compressing air in a water reservoir of the embodiment in FIG. 14.

A device suitable for supplying the pressurized water to the water reservoir is shown in FIG. 16. This device comprises a water pump 360, which is used to pump water from a contaminated or impure water source 362 into an inlet 363 of an elastomeric bladder 364. The elastomeric bladder is fabricated of an elastomeric material, such as surgical tubing, which expands when filled with pressurized water, thereby maintaining the water under pressure when the pump is not being operated. An outlet 365 of the elastomeric bladder is connected to the reservoir inlet port by a tube 366, thereby enabling the water contained within the elastomeric bladder to be supplied under pressure to the water purification apparatus.

Pressurized water in water reservoir 346 exits an outlet port 370, which is connected by a fluid line (not shown) to an inlet port 372 disposed in the base of primary boiler 305. Water within the primary boiler is heated and converted into steam. To heat the water into steam, a suitable heat source, such as a portable stove (not shown) as discussed above with reference to the single stage water purification apparatus applies heat to core 300. Heat applied to the core and to fins 302 is transferred to the water in the primary boiler, vaporizing at least a portion of the water into steam.

The steam flows from the top of the primary boiler over a relatively small gap 324 into primary condenser 307. Note that if the optional hydrolysis catalyst element 332 (or catalyst-coated surface) is used, the steam passes over the hydrolysis catalyst prior to entering the condenser, thereby causing a thermocatalytic reaction that deactivates organic toxins present in the steam.

The steam entering the primary condenser is allowed to expand as it flows through 324, cooling the steam to form liquid water. It should be noted that the pressure in the primary condenser preferably is lower than in the primary boiler, but greater than atmospheric. As a result, the temperature of the water condensed in the primary condenser will likely be in excess of 100° C. The water exits the primary condenser through an outlet port 374 defined in a base portion of the primary condenser and through a fluid conduit (not shown) that connects outlet port 374 to an inlet port 376 disposed in the base portion of secondary boiler 334.

The water entering secondary boiler 334 is heated sufficiently to convert a portion of the water into steam. Since the pressure in the secondary boiler is less than the pressure in the primary boiler and condenser, the temperature at which the water in the secondary boiler will be converted into steam is lower than the temperature of the steam/water in the primary condenser. Heat is transferred through primary condenser outer wall 308 into the secondary boiler to heat the water in the secondary boiler. The steam from the secondary boiler passes through a gap 344 and is condensed in secondary condenser 336. Since the water in water reservoir 346 is relatively cool (e.g., 5–25° C.), heat is rapidly absorbed by the water in the reservoir from the steam through secondary condenser outer wall 314, causing the steam to condense. The water formed by the condensing steam fills the lower portion of the secondary condenser with purified liquid water. The purified water can then be removed through a tap (not shown) connected to an outlet port 378.

Figure 15:
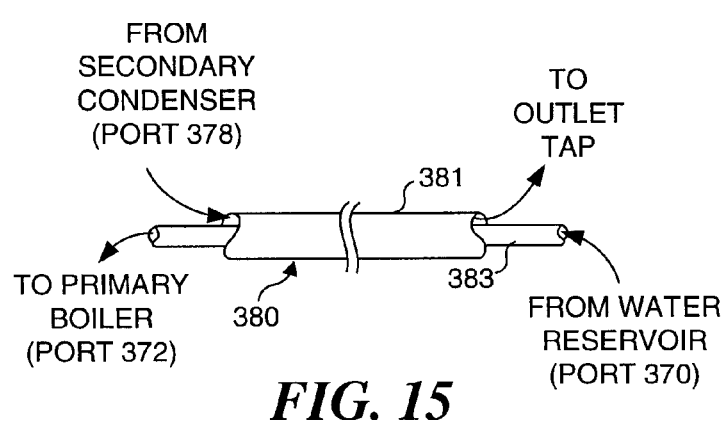
FIG. 15 shows a cut-away portion of a tube-in-tube counterflow heat exchanger used in the second preferred portable embodiment for preheating water entering a primary boiler and cooling water exiting the secondary condenser.

In a manner similar to that described above with reference to the single stage water purifying apparatus, the overall efficiency of the dual stage water purifying apparatus can be improved through the use of a counterflow heat exchanger 380, comprising a coiled tube-in-tube configuration that is connected to appropriate ports on the dual stage water purifying apparatus, as shown in FIG. 15. Counterflow heat exchanger 380 includes an outer tube 381 that conveys water from outlet port 378 on the secondary condenser to a second outlet tap (not shown), and an inner tube 383 conveys impure water from outlet port 370 on the water reservoir to inlet port 372 on the primary boiler. Water from the secondary condenser is thus further cooled, while water flowing into the primary boiler is preheated in counterflow heat exchanger 380.

The process of converting the contaminated or impure water into steam that is then condensed purifies the water through a distillation process by removing undesirable inorganic components (such as dirt, salt, etc.) from the water, and deactivates undesired biological species. In situations where chemical warfare agents might be present in the unpurified water, the alternative embodiment employing the catalyst-coated boiler surface area or containing a catalyst element will likely be used to deactivate such toxic chemical agents, as discussed above.

Experimental Results

The portable water purification apparatus has been shown to remove or deactivate an extremely high portion of toxic species contained in contaminated water sources. For example, the efficacy of the apparatus in removing or deactivating anthrax spores was evaluated by processing water contaminated with *Bacillus subtilis* spores, which are very similar to spores of *Bacillus anthracis*, commonly known as anthrax. The contaminated water had concentration levels of Bacillus between 130 and 460 cfu/mL (colony forming units per milliliter), and no viable spores were found in the purified water produced by the apparatus described above. Based on the highest inlet concentration, the results of this test imply that more than 99.8% of the spores were removed or deactivated.

In addition to the *Bacillus subtilis* spore tests, the apparatus was tested with water contaminated with a wide range of biological pathogens. The results of these tests are shown in TABLE 1.

TABLE 1

| Microbe Species | Removal/Deactivation Efficiency (%) |
|---|---|
| *Pseudomonas aeruginosa* | >99.9995 |
| *Burkholderia cepacia* | 99.999 |
| *Escherichia coli* | 99.999 |
| Generic coliforms (*E. coli*, enteric bacteria, Shigella, Klebsiella) | >99.99 |
| *Saccharomyces cerevisiae* | >99.9997 |
| *Cryptosporidium parvum* (oocysts) | >99 |
| *Giardia lamblia* (cysts) | >99 |
| Enterovirus | >95 |
| *Listeria innocua* Seeliger | >99.9995 |

In those cases where a greater than some percentage value is given in the table, no viable organisms were found in the processed water, demonstrating that the portable water purification apparatus is very effective in purifying water contaminated with biological pathogens. The apparatus has also been shown to remove more than 99% of the salt from simulated seawater.

Although the present invention has been described in connection with several preferred forms of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A water purification apparatus comprising:

(a) a primary boiler having an inlet port for receiving pressurized unpurified water and comprising an annular volume defined by an external surface of a cylindrical core, a primary boiler shell extending circumferentially about the cylindrical core, a primary cap extending between a top portion of the cylindrical core and a top portion of the primary boiler shell, and a bottom plate extending between a bottom portion of the cylindrical core and a bottom portion of the primary boiler shell, the cylindrical core of the primary boiler being adapted to receive heat from an external heat source to vaporize the pressurized unpurified water in the primary boiler, producing pressurized steam, the primary boiler shell having an outlet port defined therein to enable the pressurized steam to leave the primary boiler;

(b) a primary condenser having an inlet port in fluid communication with the outlet port of the boiler and comprising an annular volume defined by the primary boiler shell, a primary condenser shell extending circumferentially about the primary boiler shell, said primary cap comprising a single plate extending between a top portion of the primary boiler shell and the primary condenser shell, and a bottom plate extending between a bottom portion of the primary boiler shell and the primary condenser shell, the primary condenser further having an outlet port through which purified water condensed in the primary condenser exits, the outlet port of the primary boiler and the inlet port of the primary condenser being commonly defined by an annular gap disposed between the single plate and an upper portion of the primary boiler shell;

(c) a secondary boiler having an inlet port in fluid communication with the outlet port of the primary condenser to receive the purified water from the primary condenser, the secondary boiler comprising an annular volume defined by an external surface of the primary condenser shell, a secondary boiler shell extending circumferentially about the primary condenser shell, a cap extending between a top portion of the primary condenser shell and a top portion of the secondary boiler shell, and a bottom plate extending between a bottom portion of the primary condenser shell and a bottom portion of the secondary boiler shell, heat being transferred between the primary condenser and the secondary boiler through the primary condenser shell for vaporizing at least part of the purified water entering the secondary boiler, forming steam, the secondary boiler having an outlet port to enable the steam to leave the secondary boiler;

(d) a secondary condenser having an inlet port in fluid communication with the outlet port of the secondary boiler and comprising an annular volume defined by the secondary boiler shell, a secondary condenser shell extending circumferentially about the secondary boiler shell, a cap extending between a top portion of the secondary boiler shell and the secondary condenser shell, and a bottom plate extending between a bottom portion of the secondary boiler shell and the secondary condenser shell, the secondary condenser further having an outlet port through which purified water condensed from the steam exits the secondary condenser; and (e) a reservoir having an outlet port in fluid communication with the inlet port of the primary boiler, an inlet port for receiving the pressurized contaminated water, and comprising an annular volume defined by the secondary condenser shell, a reservoir shell extending circumferentially about the secondary condenser shell, a bottom plate extending between the reservoir shell and the secondary condenser shell, and a cap extending between a top portion of the reservoir shell and the secondary condenser shell, said reservoir containing the pressurized unpurified water.

2. A water purification apparatus comprising:

(a) a primary boiler having an inlet port for receiving pressurized unpurified water and an annular volume defined by an external surface of a cylindrical core, a primary boiler shell extending circumferentially about the cylindrical core, a cap extending between a top portion of the cylindrical core and a top portion of the primary boiler shell, and a bottom plate extending between a bottom portion of the cylindrical core and a bottom portion of the primary boiler shell, the cylindrical core of the primary boiler being adapted to receive heat from an external heat source to vaporize the pressurized unpurified water in the primary boiler, producing pressurized steam, the primary boiler shell having an outlet port defined therein to enable the pressurized steam to leave the primary boiler;

(b) a primary condenser having an inlet port in fluid communication with the outlet port of the boiler and an annular volume defined by the primary boiler shell, a primary condenser shell extending circumferentially about the primary boiler shell, a cap extending between a top portion of the primary boiler shell and the primary condenser shell, and a bottom plate extending between a bottom portion of the primary boiler shell and the primary condenser shell, the primary condenser further having an outlet port through which purified water condensed in the primary condenser exits;

(c) a secondary boiler having an inlet port in fluid communication with the outlet port of the primary condenser to receive the purified water from the primary condenser, the secondary boiler comprising an annular volume defined by an external surface of the primary condenser shell, a secondary boiler shell extending circumferentially about the primary condenser shell, a secondary cap extending between a top portion of the primary condenser shell and a top portion of the secondary boiler shell, and a bottom plate extending between a bottom portion of the primary condenser shell and a bottom portion of the secondary boiler shell, heat being transferred between the primary condenser and the secondary boiler through the primary condenser shell for vaporizing at least part of the purified water entering the secondary boiler, forming steam, the secondary boiler having an outlet port to enable the steam to leave the secondary boiler;

(d) a secondary condenser having an inlet port in fluid communication with the outlet port of the secondary boiler and an annular volume defined by the secondary boiler shell, a secondary condenser shell extending circumferentially about the secondary boiler shell, said secondary cap also extending between a top portion of the secondary boiler shell and the secondary condenser shell, such that said secondary cap comprises a single plate, and a bottom plate extending between a bottom portion of the secondary boiler shell and the secondary condenser shell, the secondary condenser further having an outlet port through which purified water condensed from the steam exits the secondary condenser, the outlet port of the secondary boiler and the inlet port of the secondary condenser being commonly defined by an annular gap disposed between the single plate and an upper portion of the secondary boiler shell; and (e) a reservoir having an outlet port in fluid communication with the inlet port of the primary boiler, an inlet port for receiving the pressurized contaminated water, and comprising an annular volume defined by the secondary condenser shell, a reservoir shell extending circumferentially about the secondary condenser shell, a bottom plate extending between the reservoir shell and the secondary condenser shell, and a cap extending between a top portion of the reservoir shell and the secondary condenser shell, said reservoir containing the pressurized unpurified water.

3. A water purification apparatus comprising:

(a) a primary boiler having an inlet port for receiving pressurized unpurified water and an annular volume defined by an external surface of a cylindrical core, a primary boiler shell extending circumferentially about the cylindrical core, a cap extending between a top portion of the cylindrical core and a top portion of the primary boiler shell, and a bottom plate extending between a bottom portion of the cylindrical core and a bottom portion of the primary boiler shell, the cylindrical core of the primary boiler being adapted to receive heat from an external heat source to vaporize the pressurized unpurified water in the primary boiler, producing pressurized steam, the primary boiler shell having an outlet port defined therein to enable the pressurized steam to leave the primary boiler;

(b) a primary condenser having an inlet port in fluid communication with the outlet port of the boiler and an annular volume defined by the primary boiler shell, a primary condenser shell extending circumferentially about the primary boiler shell, a cap extending between a top portion of the primary boiler shell and the primary condenser shell, and a bottom plate extending between a bottom portion of the primary boiler shell and the primary condenser shell, the primary condenser further having an outlet port through which purified water condensed in the primary condenser exits;

(c) a secondary boiler having an inlet port in fluid communication with the outlet port of the primary condenser to receive the purified water from the primary condenser, the secondary boiler comprising an annular volume defined by an external surface of the primary condenser shell, a secondary boiler shell extending circumferentially about the primary condenser shell, a cap extending between a top portion of the primary condenser shell and a top portion of the secondary boiler shell, and a bottom plate extending between a bottom portion of the primary condenser shell and a bottom portion of the secondary boiler shell, heat being transferred between the primary condenser and the secondary boiler through the primary condenser shell for vaporizing at least part of the purified water entering the secondary boiler, forming steam, the secondary boiler having an outlet port to enable the steam to leave the secondary boiler;

(d) a secondary condenser having an inlet port in fluid communication with the outlet port of the secondary boiler and an annular volume defined by the secondary boiler shell, a secondary condenser shell extending circumferentially about the secondary boiler shell, a cap extending between a top portion of the secondary boiler shell and the secondary condenser shell, and a bottom plate extending between a bottom portion of the secondary boiler shell and the secondary condenser shell, the secondary condenser further having an outlet port through which purified water condensed from the steam exits the secondary condenser;

(e) a reservoir having an outlet port in fluid communication with the inlet port of the primary boiler, an inlet port for receiving the pressurized contaminated water, and comprising an annular volume defined by the secondary condenser shell, a reservoir shell extending circumferentially about the secondary condenser shell, a bottom plate extending between the reservoir shell and the secondary condenser shell, and a cap extending between a top portion of the reservoir shell and the secondary condenser shell, said reservoir containing the pressurized unpurified water;

(f) a pump that draws unpurified water from a contaminated water source through an inlet and delivers the unpurified water through an outlet; and (g) an elastomeric bladder having an inlet port in fluid communication with the outlet of the pump, and an outlet port in fluid communication with the inlet port of the reservoir, wherein the elastomeric bladder expands as it is filled with unpurified water by the pump, thereby maintaining the unpurified water at a pressure above atmospheric pressure.

* * * * *